June 7, 1938. J. BATE 2,119,900
MANUFACTURE OF BEARINGS
Filed Jan. 11, 1936 3 Sheets-Sheet 3

Inventor:
John Bate,
By Potter, Pierce & Scheffler,
Attys

UNITED STATES PATENT OFFICE 2,119,900

MANUFACTURE OF BEARINGS

John Bate, Alperton, England, assignor to The Glacier Metal Company Limited, Alperton, England, a British company Application January 11, 1936, Serial No. 58,741
In Great Britain January 25, 1935

10 Claims. (Cl. 29—149.5)

This invention relates to bearings and their method of manufacture, and more particularly to split or half bearing shells of the type having deep flanges, such as are used in cases where substantial thrust occurs, for example, in main bearings of internal combustion engines used on motor vehicles. The term "bearing shell" is used in this specification to denote a bearing before it has been given a coating of bearing metal or white metal.

It has hitherto been customary to produce deep flanged half bearing shells of this type by turning, or other relatively expensive methods, owing to the difficulty of avoiding cracking of the metal from which the flanges are formed, when the half bearing shell is formed by pressing to shape from a flat blank. According to other processes, metal blanks have been subjected to pressure in closed dies to produce a flow of the plastic metal to conform to the cavity of the dies, but the enormous pressures which would be required to produce a flow of steel in closed dies have limited this process to the working of relatively soft metals.

The present invention has for its object to provide an improved half bearing shell, and an improved method for the production of the same which shall be quicker, more economical and more accurate than has heretofore been possible.

According to the present invention a flat metal blank of rectangular, or substantially rectangular shape is first bent to form a U-shaped piece having a curvature at its apex approximating to the desired curvature of the finished half bearing shell, but having the two end limbs of the U left substantially flat for a suitable distance from their ends, the said limbs being either tangentially disposed to the curved part, or preferably diverted slightly outwardly; the U-shaped piece is then subjected to the action of a flanging press whose die plates are adapted to turn the side margins of the U-shaped piece upwardly towards its apex at right-angles, to form a flange or flanges of substantial depth, the said die plates being so shaped and positioned in relation to the punch that the upwardly pressed flange is squeezed between the inner sides of the die plates and the outer sides of the punch, whereby metal is caused to flow from the four corners of the U-shaped piece towards the apex of the flanges.

The invention, moreover, includes a flanging press for forming a flanged half bearing shell from a U-shaped piece, wherein the spaces between the outer side faces of the punch and the inner faces of the die plates are slightly less than the thickness of the metal of the U-shaped piece.

It has been found that in a case, for example, where flanged half bearing shells are being produced from mild steel blanks of ⅛" thickness and having an internal diameter of about 2½" and a flanged depth of ½", satisfactory results are secured by making the spaces between the inner faces of the die plates and outer side faces of the punch about 1/100" less than the thickness of the metal blank.

According to the invention, moreover, the corners of the U-shaped piece are the first to be subjected to the action of the flanging dies, whereby the metal, while in the course of being subjected to the squeezing action between the sides of the die plates and sides of the punch, is caused to flow upwardly towards the apex of the flange in order to compensate for the natural loss of metal due to the increase in length which takes place in the side margin of the U-shaped piece when the flange is formed.

The outward bending of the end limbs of the U-shaped piece facilitates the initial upward bending of the corners while forming the flange, and the flow of metal from the corners to the apex of the flanges avoids the formation of radial cracks which would otherwise occur in the curved portion of the flange or flanges.

The height of the flanges is proportional to the thickness of metal in the said flanges, which again is dependent upon the space left between the inner sides of the die plates and sides of the punch.

The invention further embraces a half bearing shell which is produced by being formed from a flat blank, bent to a U-shaped piece, and then subjected in open dies to the action of a flanging press arranged first to bend upwardly the four corners of the U-shaped piece and finally the side margins thereof, and at the same time to compress the said side margins so that a flange or flanges are formed of lesser thickness than the main portion of the half bearing shell.

The initial bending of the blank to a U-shaped piece may be effected in a separate operation from that in which the forming of the flanges takes place, or, by the use of suitably constructed dies, the bending and the flanging may be accomplished by pressing from flat blanks in a single operation.

The combined operation could be performed by arranging the flanging press so that the former projects somewhat further above the press than is normally the case. The flat metal blank would then be held in position by locators in the usual manner across the former, and then subjected to the action of the punch, which would first of all bend the blank around the former. The former would then be allowed to sink down between the die plates as hereinafter described with reference to the flanging process.

The invention is applicable to the production of half bearing shells of the character referred to from mild steel, nickel, or other suitable metal or metal alloy. The resulting half bearing shell may have its working surface or surfaces coated or lined with bearing metal, and the blank from which the half bearing shell is pressed may be initially provided with one or more grooves, channels or the like in its surface, for the purpose of forming a key for any coating or lining which may be applied, or for any other purpose.

One embodiment of the invention is illustrated, merely by way of example, in the accompanying drawings, whereof:—

Throughout the specification like parts will be referred to by like reference numerals.

Figure 1:
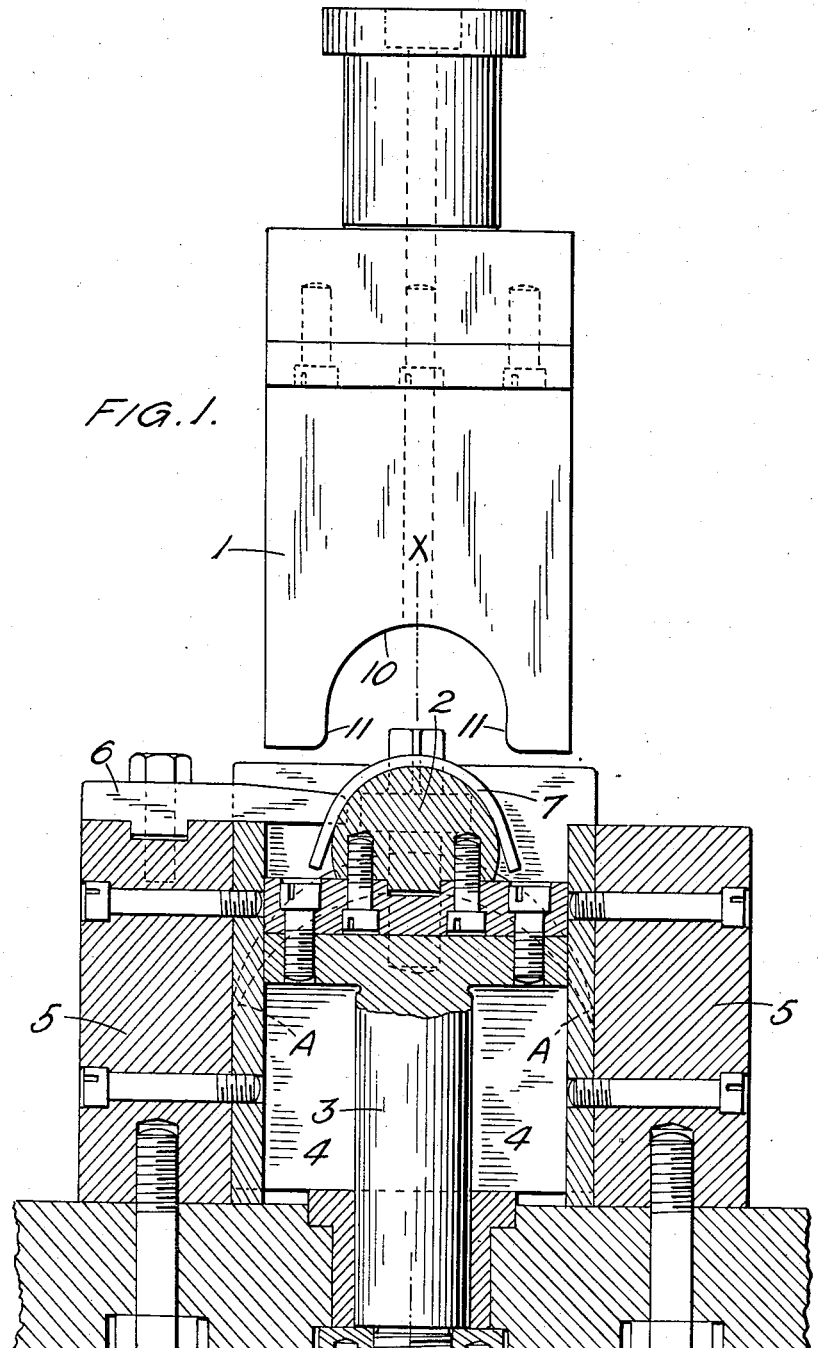
Fig. 1 shows a part sectional side elevation of a flanging machine, adapted to form a flange upon a metal blank which has already been bent into a U-shaped piece, and which is shown in position, with the punch out of engagement above the top of the "former".
Figure 2:
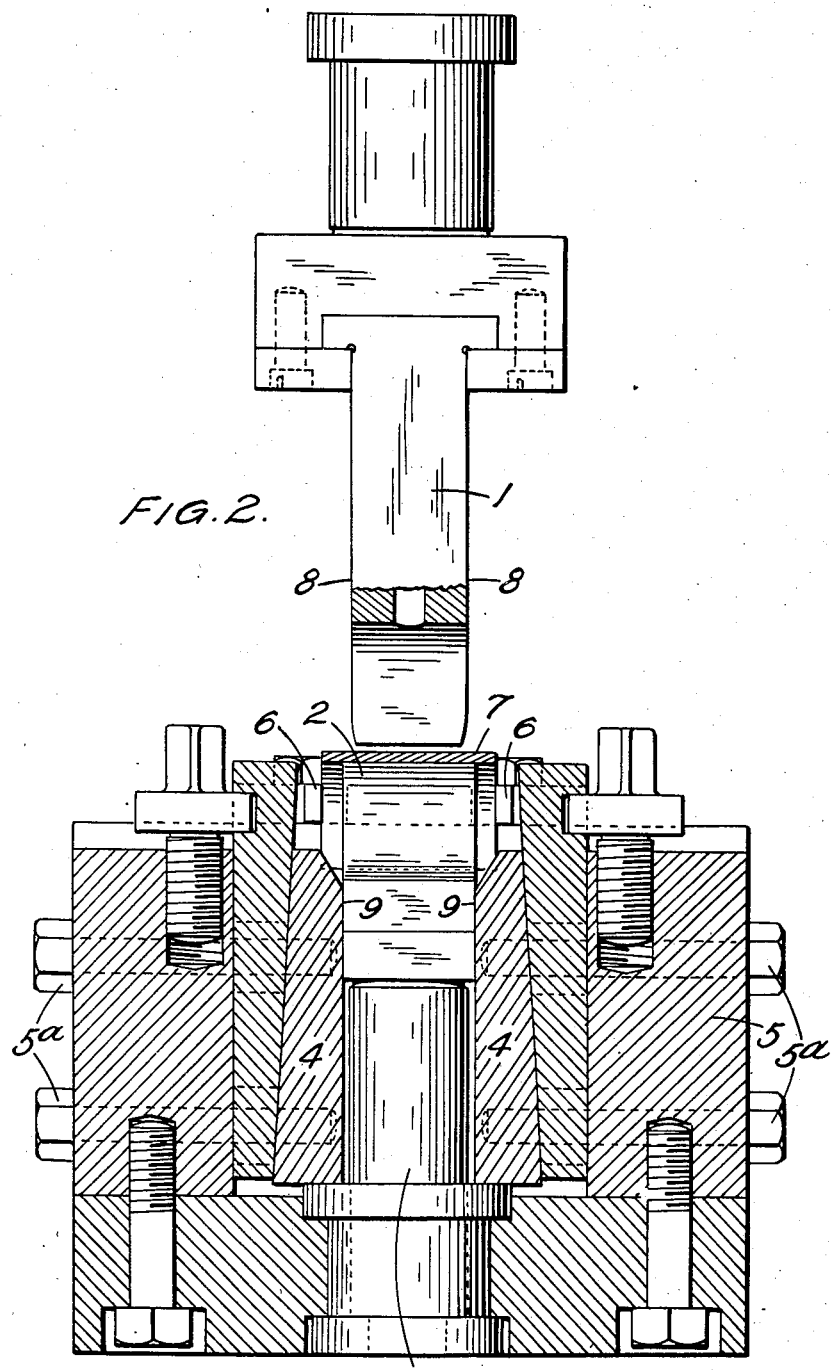
Fig. 2 shows a part section at right angles to that shown in Fig. 1, taken along the line x—x.
Figure 3:
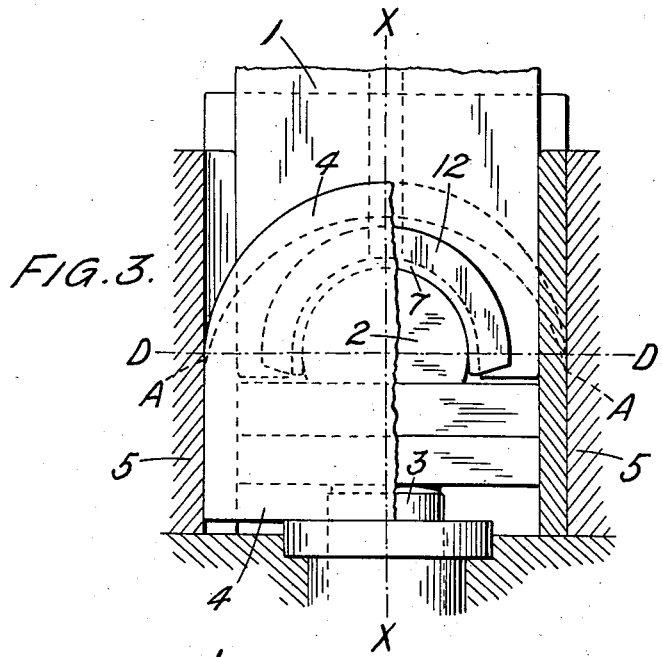
Fig. 3 shows a part sectional elevation of a portion of the machine with the half bearing shell in position, and the punch at the bottom of its stroke.

Referring to Figs. 1 and 2 of the drawings, the flanging machine comprises a punch 1 adapted to engage with a former 2 which is mounted upon a sliding shaft 3. The outer surface of the former 2 and the inner surface of the punch 1 have a curvature corresponding to the desired curvature of the inner and outer surfaces of the half bearing shell respectively. At each side of the former 2 there are located die plates 4, the upper ends of which are semi-circular, and are bevelled as shown along the dotted lines A—A (Figs. 1 and 3). The exact radius of the inner and outer edges of the bevel will vary slightly according to the size, thickness and diameter of the finished bearing shell which is to be produced.

The die plates 4 and the former 2 are located inside a bolster 5 which is substantially square, and bolts 5a hold the die-plates 4 in position. The bolster 5 is provided with one or more locators 6 (Fig. 1) on its upper surface for the purpose of holding the half bearing shell 7 in position during the flanging operation. The distance between the side walls 8 of the punch 1 and the inner faces 9 of the dies 4 is slightly less (by about 1/100") than the thickness of the metal in the body of the half bearing shell 7.

In order to allow for the final trimming and pressing operations after the flange has been formed on the bearing shell 7, a margin of metal must be left at each of its ends, and the half bearing shell must therefore be formed in slightly more than a semi-circle. For this purpose the hollow portion 10 of the punch 1 is extended downwardly at each side as shown at 11 (Fig. 1), and in a similar manner the corresponding curved portion of the former 2 is made slightly more than a semi-circle.

Figure 4:
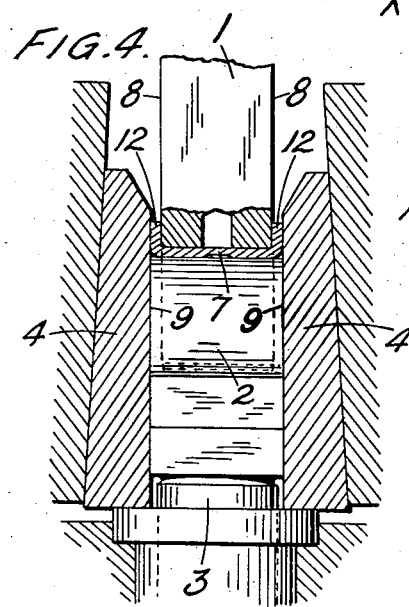
Fig. 4 shows a part section on the line x—x of Fig. 3.

Referring to Figs. 3 and 4 of the drawings, the punch 1 is shown at the foot of its stroke and the half bearing shell 7 is shown between the punch 1 and the former 2. The flanges 12 are of less thickness than the centre portion of the half bearing shell, for the reason described above, and the curvature of the die plates 4 is again shown by the lines A—A (Fig. 3).

In operation the flanging machine functions as follows:— Assuming the punch 1 to be at the top of its stroke, and the former 2 to be also at its uppermost position, an approximately semi-cylindrical or U-shaped piece 7 is placed upon the former 2, and maintained in position by the locator 6. Power is applied to the punch 1, and it is forced downwardly into contact with the U-shaped piece 7, and in turn pushes down the former 2 on its shaft 3, so that the U-shaped piece 7 is first of all forced into contact at its corners with the bevelled edges of the die plates 4. As the punch travels further downwards the metal at the corners with side margins of the U-shaped piece 7 is squeezed between the inner surfaces 9 of the die plates 4 and the outer surfaces 8 of the punch 1, and caused to flow upwardly thus forming the flanges 12 (see Figs. 4 and 5). The flow of metal takes place towards the apex of the said flanges 12.

The punch 1 is withdrawn on the upstroke of the flanging machine and the former 2 is returned to its original position by spring means, such as a resilient pad, rubber buffer, coil spring or the like (not shown in drawings). The said spring means is, of course, compressed when the punch comes down to perform the flanging operation.

As described above, the half bearing shell is first formed in rather more than a semi-circle, and the surplus metal below the line D—D (Fig. 3) is cut off in a separate operation.

Figure 5:
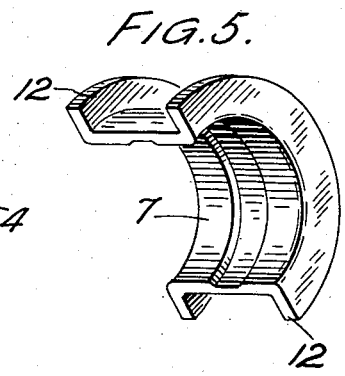
Fig. 5 shows a finished half bearing shell before the coating of bearing metal is applied.

When the surplus metal has been cut off, the half bearing shell presents an appearance as shown in Fig. 5. It may then, if desired, be finished by subjecting it to a coin-pressing operation, or it may alternatively be trued up by turning or any other known method, before being coated with bearing metal.

What I claim and desire to secure by Letters Patent is:—

1. Process for forming a flanged half-bearing shell of substantially semi-circular shape from a metal blank, which comprises bending said blank into a U-shaped piece to form a curvature at the apex of the U approximating to that of the finished shell, the legs of said U being left substantially straight for a partial distance from their ends, and being at least tangentially disposed and preferably diverted slightly outwardly in relation to said curved portion, subjecting said U-shaped piece to the action of an open flanging press whereby the side margins of the U are turned upwardly towards its apex to form flanges beginning at the four corners, and simultaneously subjecting said side margins to a compressive stress to cause metal to flow from said four corners towards the apices of said flanges to compensate for the shortage of metal which would normally exist at said apices due to the increased radius at the edges of said flanges.

2. Process for forming a flanged half-bearing shell of substantially semi-circular shape from a metal blank, which comprises bending said blank into a U-shaped piece to form a curvature at the apex of the U approximating to that of the finished shell, the legs of said U being left substantially straight for a partial distance from their ends, and being at least tangentially disposed and preferably diverted slightly outwardly in relation to said curved portion, subjecting said U-shaped piece to the action of the punch and the former of an open flanging press adapted to bend it to a semi-circular shape, and simultaneously passing said U-shaped piece between a pair of die-plates to divert the side margins of said U-shaped piece to form flanges, beginning at the four corners, while at the same time compressing and causing a flow of metal from said four corners towards the apices of said flanges thereby compensating for the shortage of metal which would normally exist at said apices due to the increased radius at the edges of said flanges.

3. Process for forming a flanged half-bearing shell as defined in claim 1, wherein the bending of the blank into a U-shaped piece is carried out in one operation and the flanging of said U-shaped piece in a second separate operation.

4. Process for forming a half-bearing shell as defined in claim 1, wherein the bending of the metal blank into a U-shaped piece and the flanging of said U-shaped piece are performed in a single operation.

5. Process for bending over the edges of a U-shaped piece of metal to form circumferential flanges, which comprises applying bending pressures first to the corners of said U-shaped piece and then progressively to the metal of the side portions between said corners to flange the side edges and simultaneously to effect a metal flow towards the apex of the flange in order to compensate for the loss of metal due to the increase in length taking place in the side margin of said U-shaped piece during the formation of the flange.

6. In the manufacture of a flanged half-bearing shell from a flat steel plate of substantially rectangular shape, the process which comprises bending the plate to approximately U-form, and bending the side edges of the U-form blank by applying pressure initially at the corners of the blank to effect a flow of metal towards the apices of the blank, the additional metal at said apices precluding the formation of radial cracks at said apices of the flanges.

7. In the manufacture of a flanged half-bearing shell in an open forming press, the method of avoiding radial cracks at the apices of the flanges which comprises bending a flat rectangular blank of metal to approximately U-form, and turning the side edges of the blank back to form flanges by applying pressure initially at the corners of the blanks and then progressively towards the central section of each side edge to displace metal from said corners towards the apices of the flanges.

8. The method as claimed in claim 7, wherein said rectangular blank is of substantially greater length than the circumferential length of the finished bearing, and said bending steps shape the central portion of the blank to cylindrical form with the end portions flaring therefrom to give the blank the approximately U-form.

9. In the manufacture of circumferentially flanged half-bearing shells, the method of flanging the side edges of a metal blank of approximately semi-cylindrical form which comprises applying pressure at each side edge progressively from the ends towards the central section thereof to turn said side edges outwardly and towards the apex of the blank to effect a flow of metal initiating at the corners of said blank and progressing to the central sections to displace metal towards the apices of the flanges as the latter are formed.

10. In the formation of flanged half-bearing shells from flat metal blanks of rectangular form, the process which comprises bending the blanks to approximately U-form and progressively forcing back the side edges of the blank from the corners thereof towards the central section to form side flanges and simultaneously to displace metal from the corners of the blank towards the apices of the side flanges.

JOHN BATE.